(12) United States Patent
Kimura

(10) Patent No.: US 6,639,704 B2
(45) Date of Patent: Oct. 28, 2003

(54) SCANNING OPTICAL APPARATUS, AND IMAGE FORMING APPARATUS USING THE SAME

(75) Inventor: Kazumi Kimura, Toda (JP)

(73) Assignee: Canon Kabushiki Kaisha, Tokyo (JP)

( * ) Notice: Subject to any disclaimer, the term of this patent is extended or adjusted under 35 U.S.C. 154(b) by 52 days.

(21) Appl. No.: 09/794,500

(22) Filed: Feb. 28, 2001

(65) Prior Publication Data

US 2001/0030792 A1 Oct. 18, 2001

(30) Foreign Application Priority Data

Feb. 29, 2000 (JP) ........................................ 2000-053547
Feb. 15, 2001 (JP) ........................................ 2001-038174

(51) Int. Cl.[7] ............................................. G02B 26/08
(52) U.S. Cl. ...................... 359/205; 359/209; 359/216; 359/212; 347/259; 347/260
(58) Field of Search ................................ 359/205–219, 359/738–740, 204; 347/243–244, 258–261

(56) References Cited

U.S. PATENT DOCUMENTS 5,422,753 A * 6/1995 Harris ........................ 359/216
6,094,286 A  7/2000 Kato ......................... 359/206

FOREIGN PATENT DOCUMENTS

JP  10-68903  3/1998

* cited by examiner

Primary Examiner—James Phan
(74) Attorney, Agent, or Firm—Fitzpatrick, Cella, Harper & Scinto

(57) ABSTRACT

A scanning optical apparatus which includes incident optical system for causing at least one light beam emitted by light source onto a deflector, and image forming optical system, having at least one diffraction surface, for imaging the at least one light beam reflected and deflected by the deflector on a surface to be scanned. The apparatus further includes limiting member, inserted in the optical path between the diffraction surface of the image forming optical system and the surface to be scanned, for limiting unnecessary diffraction light of another order with respect to diffraction light of an order used to form a spot on the surface to be scanned from among the diffraction light diffracted by the diffraction surface.

16 Claims, 11 Drawing Sheets

SCANNING OPTICAL APPARATUS, AND IMAGE FORMING APPARATUS USING THE SAME

BACKGROUND OF THE INVENTION

1. Field of the Invention

The present invention relates to a scanning optical device and an image forming apparatus using the same and, more particularly, to a device suitable for an apparatus such as a laser beam printer, digital copying machine, or the like, which has, e.g., an electrophotography process for recording image information by reflecting and deflecting (deflecting and scanning) at least one light beam, which has been optically modulated and emitted by light source means, by deflection means comprising a rotary polygonal mirror or the like, and scanning a surface to be scanned with the light beam via image forming means having at least one diffraction surface.

2. Related Background Art

Conventionally, in a scanning optical device of, e.g., a laser beam printer (LBP) or the like, a light beam, which has been optically modulated and emitted by light source means in accordance with an image signal, is periodically deflected by a beam deflector comprising, e.g., a rotary polygonal mirror, and is focused by image forming means having f-θ characteristics to form a spot on the surface of a photosensitive recording medium (photosensitive drum), and to scan that surface with the beam spot, thus recording an image.

Furthermore, various scanning optical devices having diffraction surfaces in a portion of image forming means (scanning optical means) have been proposed in, e.g., Japanese Patent Application Laid-Open No. 10-68903 and the like. In Japanese Patent Application Laid-Open No. 10-68903, image forming means uses an optical element having a refraction portion (refraction surface) and diffraction portion (diffraction surface). When the powers of the refraction and diffraction portions are set to satisfy a desired condition, changes in magnification and focus in the main scanning direction due to the temperature drift of the scanning optical device are corrected by a change in power of the refraction and diffraction portions of the image forming means, and the wavelength drift of a semiconductor laser as light source means. With this arrangement, even when the temperature drifts, a high-quality image can be obtained.

The diffraction surface of the optical element which serves as the image forming means and has the refraction and diffraction surfaces is normally formed to have a grating pattern so that first-order diffraction light as diffraction light of an order to be used (use diffraction light) has a maximum intensity. At this time, of the diffraction light components diffracted by the diffraction surface, the amount of unnecessary (high-order) diffraction light components is smaller than the diffraction light of the order used to form a spot on the surface to be scanned. However, in a scanning optical device in which the angle of incidence onto the diffraction surface changes depending on the image height, the unnecessary (high-order) diffraction light components increase/decrease in correspondence with the image height. In the actual manufacturing process, since a manufacturing error is produced with respect to an ideal diffraction grating pattern, unnecessary (high-order) diffraction light components often increase.

Such unnecessary (high-order) diffraction light becomes flare as stray light, and adversely influences image quality.

Furthermore, a scanning lens system (image forming means) of a scanning optical device including such diffraction optical element is normally made up of a plastic lens, and an anti-reflection coat to be formed on the refraction surface is often omitted since it suffers many technical and cost problems. For this reason, reflected diffraction light produced by the diffraction surface is reflected by the refraction surface of the plastic lens without any anti-reflection coat, and becomes ghost as stray light.

This state will be explained below using FIGS. 10 and 11.

FIG. 10 is a sectional view showing principal part of the conventional scanning optical device in the main scanning direction.

In FIG. 10, a divergent light beam emitted by a light source means 91 is converted into a nearly collimated light beam by a collimator lens 92, and is limited by a stop 93. The light beam then enters a cylindrical lens 94 having a predetermined refracting power in only the sub scanning direction. Of the nearly collimated light beam that has entered the cylindrical lens 94, light components in the main scanning section leave the lens as they are. On the other hand, light components in the sub scanning section are focused, and form a nearly linear image on a deflection surface (reflection surface) 95a of a beam deflector 95 comprising a polygonal mirror.

A light beam 15 (15P, 15U, 15L) reflected and deflected by the beam deflector enters an image forming means (scanning lens system) 85 which comprises a refraction optical element 81 and diffraction optical element 82. In FIG. 10, a plastic toric lens 81 and long diffraction optical element 82 are inserted in turn from the side of the beam deflector 95. The long diffraction optical element 82 has different powers in the main scanning direction and sub scanning direction, forms image of the light beam coming from the beam deflector 95 on a surface 96 to be scanned, and corrects any inclination of the deflection surface (mirror surface) of the beam deflector 95. The light beam which has left the image forming means 85 forms an image on the surface 96 to be scanned, and optically scans the surface 96 to be scanned in the direction of an arrow B (main scanning direction) upon rotating the beam deflector 95 in the direction of an arrow A, thus recording image information.

In FIG. 10, the long diffraction optical element 82 has an entrance surface 83 serving as a refraction surface, and an exit surface 84 serving as a diffraction surface (diffraction grating surface). Most light components of the light beam 15 (15P, 15U, 15L) reflected and deflected by the beam deflector 95 are imaged on the surface 96 to be scanned as use diffraction light (normally, +1st-order diffraction light), thus forming a beam spot (not shown).

However, some light components of the light beam 15 (15P, 15U, 15L) reflected and deflected by the beam deflector 95 become unnecessary high-order diffraction light. Of these light components, sixth-order reflected diffraction light (reflected sixth-order diffraction light) diffracted by the diffraction surface 84 will be examined below.

In FIG. 10, of the reflected sixth-order diffraction light, a light beam 16 (16P, 16U, 16L) is surface-reflected by the refraction surface 83, is also diffracted by the diffraction surface 84, and travels toward the surface 96 to be scanned as use diffraction light (normally, +1st-order diffraction light). As can be seen from FIG. 10, such reflected sixth-order diffraction light hits the surface 96 to be scanned as stray light although it does not form any image.

The behavior of stray light of the reflected sixth-order diffraction light that scans the surface to be scanned will be explained below using FIG. 11. In FIG. 11, the abscissa plots the image height of a primary beam spot which reaches the surface 96 to be scanned, and the ordinate plots the position of stray light of the reflected sixth-order diffraction light on the surface 96 to be scanned. When the primary beam spot scans the surface 96 to be scanned, the stray light of the reflected sixth-order diffraction light scans the surface 96 to be scanned accordingly, and the scan speed lowers at image height positions near ±80 mm. As a result, many stray light components gather around the image height positions of ±80 mm, thus considerably deteriorating image quality.

Stray light such as flare, ghost, or the like blurs an image on the surface to be scanned. For example, in a laser beam printer (LBP), a blurred image is printed. Furthermore, in recent years, since the sensitivity of a photosensitive drum is increasing to express a halftone image, deterioration of image quality due to stray light is not negligible.

SUMMARY OF THE INVENTION

In one aspect of the invention, there is provided a scanning optical apparatus comprising incident optical means for causing at least one light beam emitted by light source means to be incident on deflection means, and image forming means, having at least one diffraction surface, for forming the image of the at least one light beam reflected and deflected by the deflection means on a surface to be scanned, wherein the scanning optical apparatus further comprises limiting means, inserted in an optical path between said diffraction surface of said image forming means and the surface to be scanned, for limiting unnecessary diffraction light of another order with respect to diffraction light of an order used to form a spot on the surface to be scanned from among the diffraction light diffracted by said diffraction surface of said image forming means.

In further aspect of the scanning optical apparatus according to the invention, said limiting means is formed by substantially parallel edge portions which extend in a main scanning direction.

In further aspect of the scanning optical apparatus according to the invention, said limiting means is formed by substantially parallel slit members which extend in a main scanning direction.

In further aspect of the scanning optical apparatus according to the invention, said limiting means is formed by a reflection member for changing a direction in which beam of the diffraction light of the order used travels.

In further aspect of the scanning optical apparatus according to the invention, said limiting means is formed by an entrance window and/or an exit window formed on a casing which holds at least one of a plurality of components that build said scanning optical device.

In further aspect of the scanning optical apparatus according to the invention, a scan width of the unnecessary diffraction light satisfies:

$$Lm/Lo < 0.8$$

where

Lm: the scan width of the unnecessary diffraction light

Lo: the effective scan width

In further aspect of the scanning optical apparatus according to the invention, a condition:

$$4 \leq m/n \leq 7$$

is satisfied, where n represents the order used, and m represents the other order.

In further aspect of the scanning optical apparatus according to the invention, the diffraction light of the order used is first-order diffraction light, and the unnecessary diffraction light is sixth-order reflected diffraction light.

In further aspect of the scanning optical apparatus according to the invention, a condition:

$$\phi o < S < \phi m$$

is satisfied, where S represents the width of an aperture of said limiting means in the sub scanning direction, $\phi o$ represents the light beam size with respect to the sub scanning direction of the light beam that is to form a primary beam spot, at the position of said limiting means, and $\phi m$ represents the size of stray light of reflected sixth-order diffraction light with respect to the sub scanning direction.

In further aspect of the scanning optical apparatus according to the invention, a condition:

$$\sqrt{(S/\phi m)} < Lm/Lo$$

is satisfied, where S represents the width of an aperture of said limiting means in the sub scanning direction, $\phi m$ represents the size of stray light of reflected sixth-order diffraction light with respect to the sub scanning direction, Lm represents the scan width of the unnecessary diffraction light, and Lo represents the effective scan width.

In another aspect of the invention, there is provided an image forming apparatus comprising the above scanning optical apparatus, a photosensitive member located at the surface to be scanned of said scanning optical apparatus, developing means for developing as a toner image an electrostatic latent image formed by scanning a surface of said photosensitive member with a light beam, transfer means for transferring the developed toner image onto a paper sheet, and fixing means for fixing the transferred toner image on the paper sheet.

In another aspect of the invention, there is provided an image forming apparatus comprising the above scanning optical apparatus, and a printer controller for converting code data input from an external device into an image signal, and inputting the image signal to said scanning optical apparatus.

It is an object of the present invention to provide a scanning optical apparatus in which limiting means for limiting unnecessary diffraction light produced by a diffraction surface is inserted in the optical path between the diffraction surface and a surface to be scanned so as to reduce unnecessary diffraction light that reaches the surface to be scanned, and an image forming apparatus using the same.

It is another object of the present invention to provide a scanning optical apparatus which improves the shape, size, and the like of members in the apparatus to reduce unnecessary diffraction light that reaches the surface to be scanned without adding any new limiting member.

DETAILED DESCRIPTION OF THE PREFERRED EMBODIMENTS

[First Embodiment]

Figure 1:
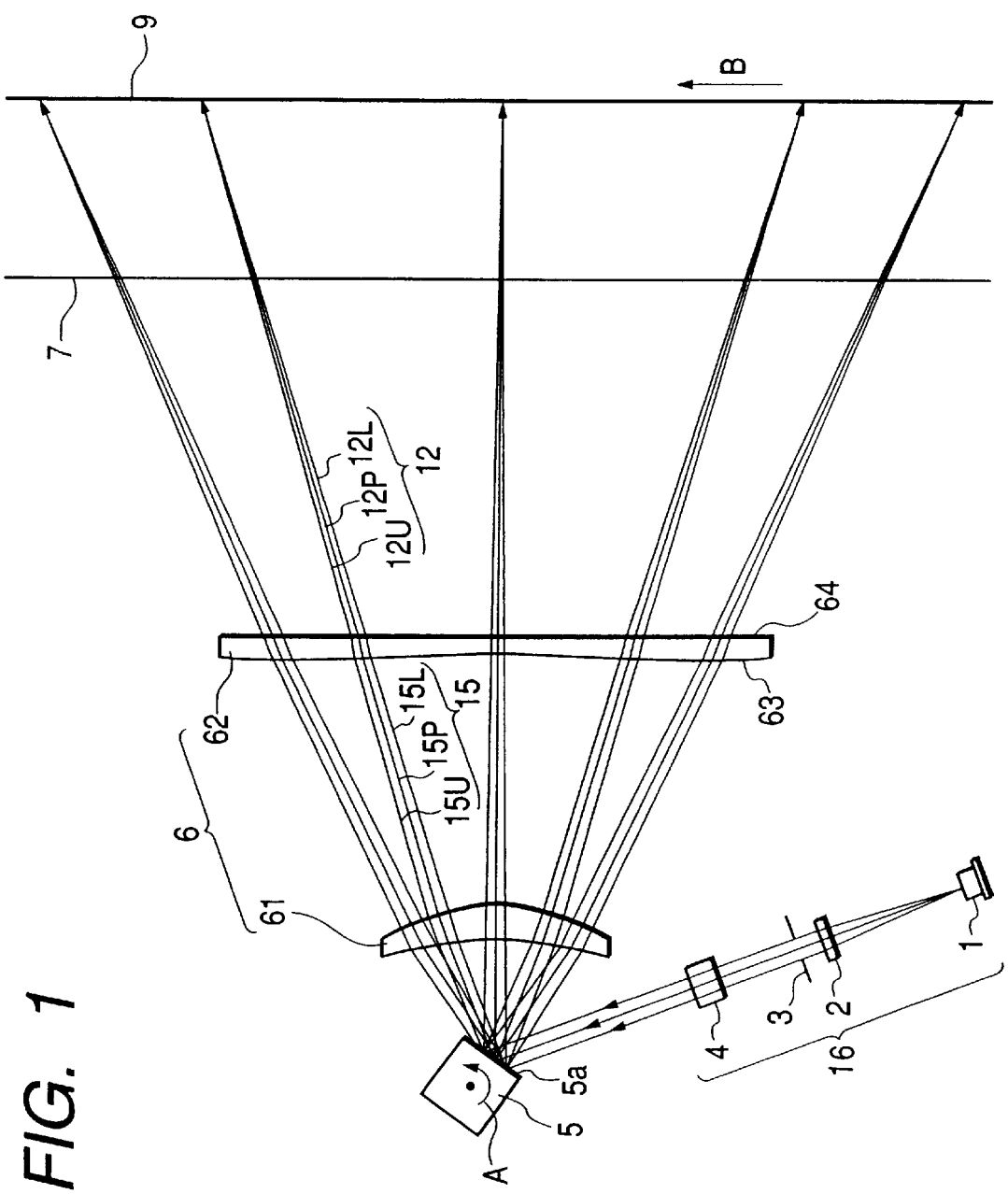
FIG. 1 is a sectional view showing principal part of the first embodiment of the present invention in the main scanning direction.
Figure 2:
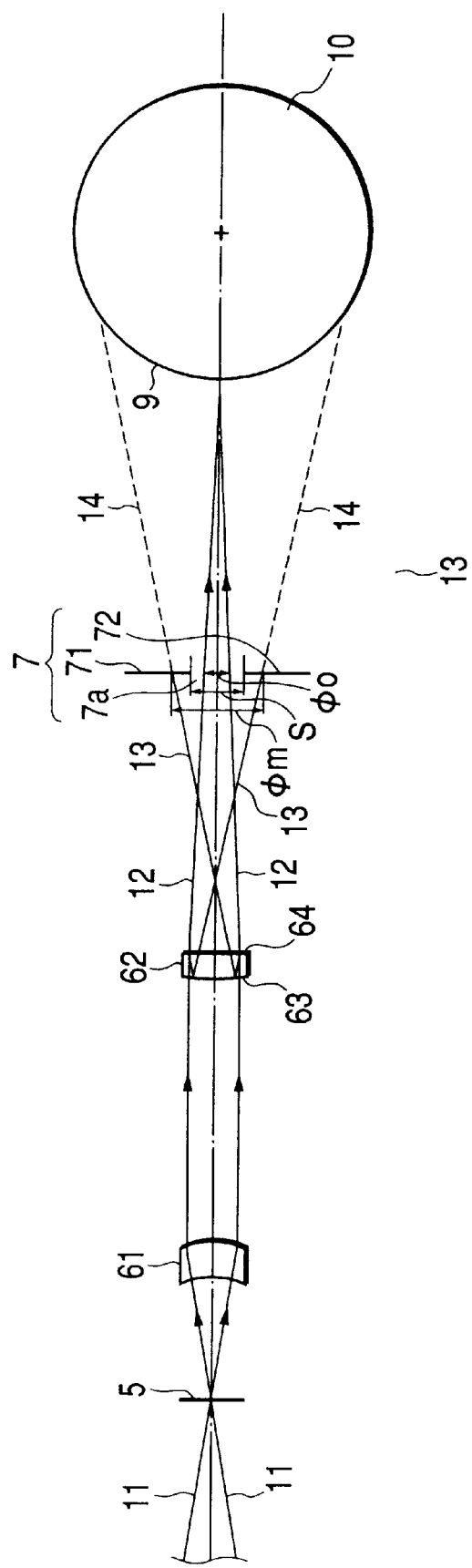
FIG. 2 is a sectional view showing principal part of the first embodiment of the present invention in the sub scanning direction.

FIG. 1 is a sectional view showing principal part of a scanning optical device according to the first embodiment of the present invention in the main scanning direction (main scanning sectional view), and FIG. 2 is a sectional view showing principal part of FIG. 1 in the sub scanning direction (sub scanning sectional view).

In this specification, a direction in which a light beam is reflected and deflected (deflected and scanned) by a beam deflector is defined as a main scanning direction, and a direction perpendicular to the optical axis of image forming means and the main scanning direction is defined as a sub scanning direction.

Referring to FIG. 1, a light source means 1 comprises a semiconductor laser having a single light-emitting point. A collimator lens 2 converts a divergent light beam emitted by the light source means 1 into a nearly collimated light beam. An aperture stop 3 limits a passage light beam (amount of light). A cylindrical lens 4 has a predetermined refracting power in only the sub scanning direction, and images the light beam that has passed through the aperture stop 3 to form a nearly linear image elongated in the main scanning direction on a deflection surface 5a of a beam deflector 5 (to be described later).

Note that components such as the semiconductor laser 1, collimator lens 2, aperture stop 3, cylindrical lens 4, and the like construct an incident optical means 16.

The beam deflector 5 serves as a deflection means and comprises, e.g., a polygonal mirror (rotary polygonal mirror), and rotates at a constant speed in the direction of an arrow A in FIG. 1 by a drive means (not shown) such as a motor or the like.

An image forming means (f-θ lens system) 6 having f-θ characteristics has a plastic toric lens 61 and an long plastic diffraction optical element 62 fabricated by injection molding in turn from the side of the beam deflector 5. The image forming means 6 has different predetermined refractive powers in the main scanning direction and sub scanning direction as a whole, images a light beam based on image information reflected and deflected (deflected and scanned) by the beam deflector 5 on a surface 9 to be scanned, and corrects any surface inclination of the deflection surface 5a of the beam deflector 5. The long diffraction optical element 62 has an entrance surface 63 serving as a refraction surface, and an exit surface 64 serving as a diffraction surface (diffraction grating surface).

In this embodiment, the base surface of the diffraction surface is macroscopically flat.

In this embodiment, most light components of a light beam 15 (15P, 15U, 15L) reflected and deflected by the beam deflector 5 are diffracted by the diffraction surface 64 as diffraction light 12 (12P, 12U, 12L) of an order (normally, +1st order) to be used (use diffraction light), and form a beam spot on the surface 9 to be scanned.

A limiting means 7 is inserted in an optical path between the diffraction surface 64 and surface 9 to be scanned, and comprises an elongated slit member which is formed of an opaque resin and has a slit aperture 7a which extends in a direction nearly parallel to the main scanning direction. The limiting means 7 passes the use diffraction light of diffraction light components diffracted by the diffraction surface 64, and intercepts most stray light components of unnecessary diffraction light of other orders.

Note that the use diffraction light is that used to form a spot on the surface 9 to be scanned of diffraction light diffracted light by the diffraction surface 64. Also, the use diffraction light is first-order transmitting diffraction light, and unnecessary diffraction light is sixth-order reflected diffraction light (reflected sixth-order diffraction light).

A photosensitive drum (image carrier) 10 has a photosensitive drum surface 9 serving as the surface to be scanned.

In this embodiment, a divergent light beam emitted by the light source means 1 is converted into a nearly collimated light beam by the collimator lens 2, and is limited by the aperture stop 3. The light beam then enters the cylindrical lens 4 having a predetermined refracting power in only the sub scanning direction. Of the nearly collimated light beam that has entered the cylindrical lens 4, light components in the main scanning section leave the lens as they are. On the other hand, light components in the sub scanning section are focused, and form a nearly line image on the deflection surface (reflection surface) 5a of the beam deflector 5 comprising a polygonal mirror.

The light beam reflected and deflected by the deflection surface 5a of the beam deflector 5 is guided onto the photosensitive drum surface 9 as the surface to be scanned via the image forming means 6 having f-θ characteristics, and is scanned on the photosensitive drum surface 9 in the direction of an arrow B (main scanning direction) by rotating the beam deflector 5 in the direction of an arrow A, thus recording image information.

The behavior of diffraction light 12 obtained by diffracting the light beam 15, which has been reflected and deflected by the beam deflector 5, by the diffraction surface 64 will be explained below using FIG. 2.

Referring to FIG. 2, stray light 13 is a light beam, which is surface-reflected by the refraction surface 63, is diffracted by the diffraction surface 64, and travels toward the surface 9 to be scanned as use diffraction light (normally, +1st-order diffraction light), of unnecessary diffraction light (reflected sixth-order diffraction light) diffracted by the diffraction surface 64.

The slit member 7 has first and second slit portions 71 and 72, and the slit aperture 7a is formed by those edge portions of the first and second slit portions 71 and 72, that are nearly parallel to the main scanning direction. In this embodiment, the slit member 7 passes the light beam that forms a primary light beam 12, and intercepts most light components of the stray light 13. With this structure, stray light 14 that unwantedly reaches the surface 9 to be scanned when no slit member 7 is inserted can be greatly reduced.

Figure 11:
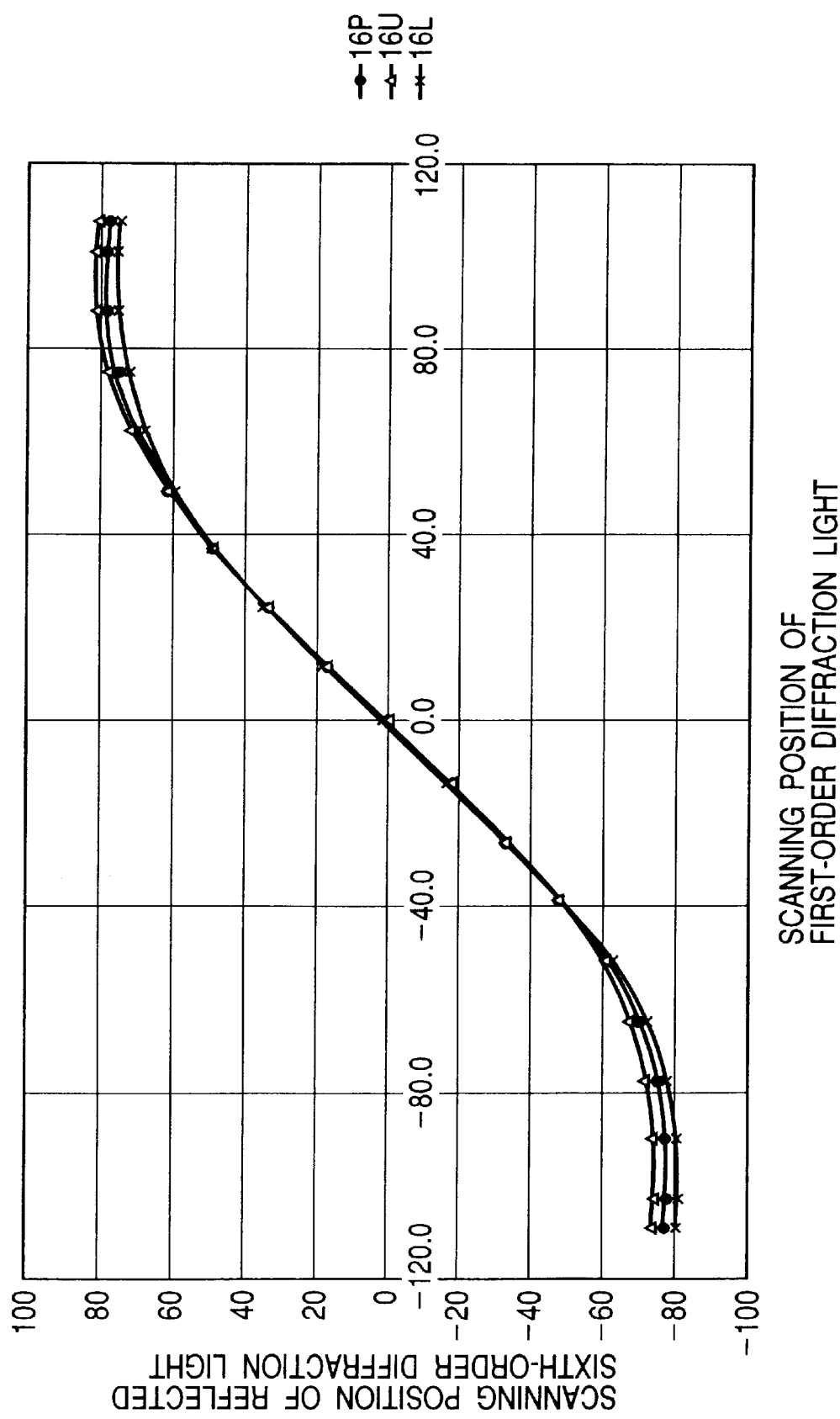
FIG. 11 is a graph showing the behavior of stray light of reflected sixth-order diffraction light that scans the surface to be scanned.

The behavior of stray light of the reflected sixth-order diffraction light that scans the surface to be scanned is as has been explained using FIG. 11. That is, in FIG. 11, the abscissa plots the image height of a primary beam spot which reaches the surface 9 to be scanned, and the ordinate plots the position of stray light of the reflected sixth-order diffraction light on the surface 9 to be scanned. As can be seen from FIG. 11, when the primary beam spot scans the surface 9 to be scanned, the stray light of the reflected sixth-order diffraction light scans the surface 9 to be scanned accordingly, and its scan range is around ±80 mm (scan width Lm=160), which is around 73% of the effective scan range of ±110 mm (effective scan width Lo=220).

In this embodiment, the scan width of the unnecessary diffraction light (reflected sixth-order diffraction light) is set to satisfy:

$$Lm/Lo < 0.8 \quad (1)$$

where

Lm: the scan width of unnecessary diffraction light

Lo: the effective scan width

In this embodiment, a width S of the slit aperture 7a of the slit member 7 with respect to the sub scanning direction is set to satisfy:

$$\phi o < S < \phi m \quad (2)$$

where $\phi o$ is the light beam size with respect to the sub scanning direction of the light beam 12, which is to form a primary beam spot, at the position of the slit member 7, and $\phi m$ is the size of the stray light 13 of the reflected sixth-order diffraction light with respect to the sub scanning direction. Conversely, the slit aperture 7a of the slit member 7 can be provided at the position that satisfies conditional formula (2).

When the width S of the slit aperture 7a in the sub scanning direction and the size $\phi m$ of the stray light of the reflected sixth-order diffraction light with respect to the sub scanning direction have a largest possible difference, more unnecessary diffraction light components can be limited, and stray light can be reduced. Especially, when the respective components are set to satisfy:

$$\sqrt{(S/\phi m)} < Lm/Lo \quad (3)$$

the stray light reduction effect can be obtained. Since the stray light locally has different scan speeds (the scan width of the stray light is Lm/Lo with respect to the effective width), as shown in FIG. 11, intensity nonuniformity of stray light Lo/Lm times that on the axis is produced on average, but stray light that the slit member 7 can limit is only that in the sub scanning direction, and the stray light reduction effect is obtained in a square root.

The reason why the sixth-order reflected diffraction light is especially considered in this embodiment will be explained below. When a diffraction grating is formed on the exit surface of an optical element like the diffraction surface 64, if n represents the order of transmitting diffraction light to be used, a grating height h of the diffraction surface 64 is set to maximize the diffraction efficiency of transmitting diffraction light which is normally used. More specifically, the grating height h can be set to obtain a phase difference corresponding to an integer multiple of a use wavelength $\lambda$ of the light source, and is given by:

$$h = n\lambda/(N-1) \quad (4)$$

where N: the refractive index of a member that forms the diffraction grating at the use wavelength $\lambda$.

At this time, of reflected diffraction light produced by the diffraction surface 64, reflected diffraction light of an order that forms a phase difference corresponding to an integer multiple of a use wavelength $\lambda$ is also maximized. More specifically, if m represents the order of such reflected diffraction light, reflected diffraction light that satisfies:

$$h = m\lambda/(2N) \quad (5)$$

is maximized.

From formulas (4) and (5), the orders m and n satisfy:

$$m/n = 2N/(N-1) \quad (6)$$

The right-hand side of this formula (6) is determined by the refractive index of the member which forms the diffraction grating at the use wavelength $\lambda$. Since the refractive index of a normal glass or plastic material approximately falls within the range of 1.4 to 2.0, from formula (6) we have:

$$4 \leq m/n \leq 7 \quad (7)$$

The order the diffraction grating normally uses is n=1, and when the diffraction optical element 62 is made of plastic in terms of easy manufacture and cost, since such material has a refractive index N≅1.5, sixth-order reflected diffraction light is produced strongly as can seen from formula (5).

As described above, in this embodiment, as the slit member 7 for limiting stray light of unnecessary diffraction light of other orders with respect to diffracted light of an order used to form a spot on the surface 9 to be scanned (use diffraction light) of the diffraction light diffracted by the diffraction surface 64 is inserted in the optical path between the diffraction surface 64 and surface 9 to be scanned, a sharp image (beam spot) can be formed on the surface 9 to be scanned, thus preventing a blurred image from being printed in, e.g., a laser beam printer.

In this embodiment, changes in magnification and focus in the main scanning direction due to temperature drift of the scanning optical device are corrected by a change in power of the refraction and diffraction portions of the image forming means, and wavelength drift of a semiconductor laser as light source means as in the aforementioned prior art.

[Second Embodiment]

Figure 3:
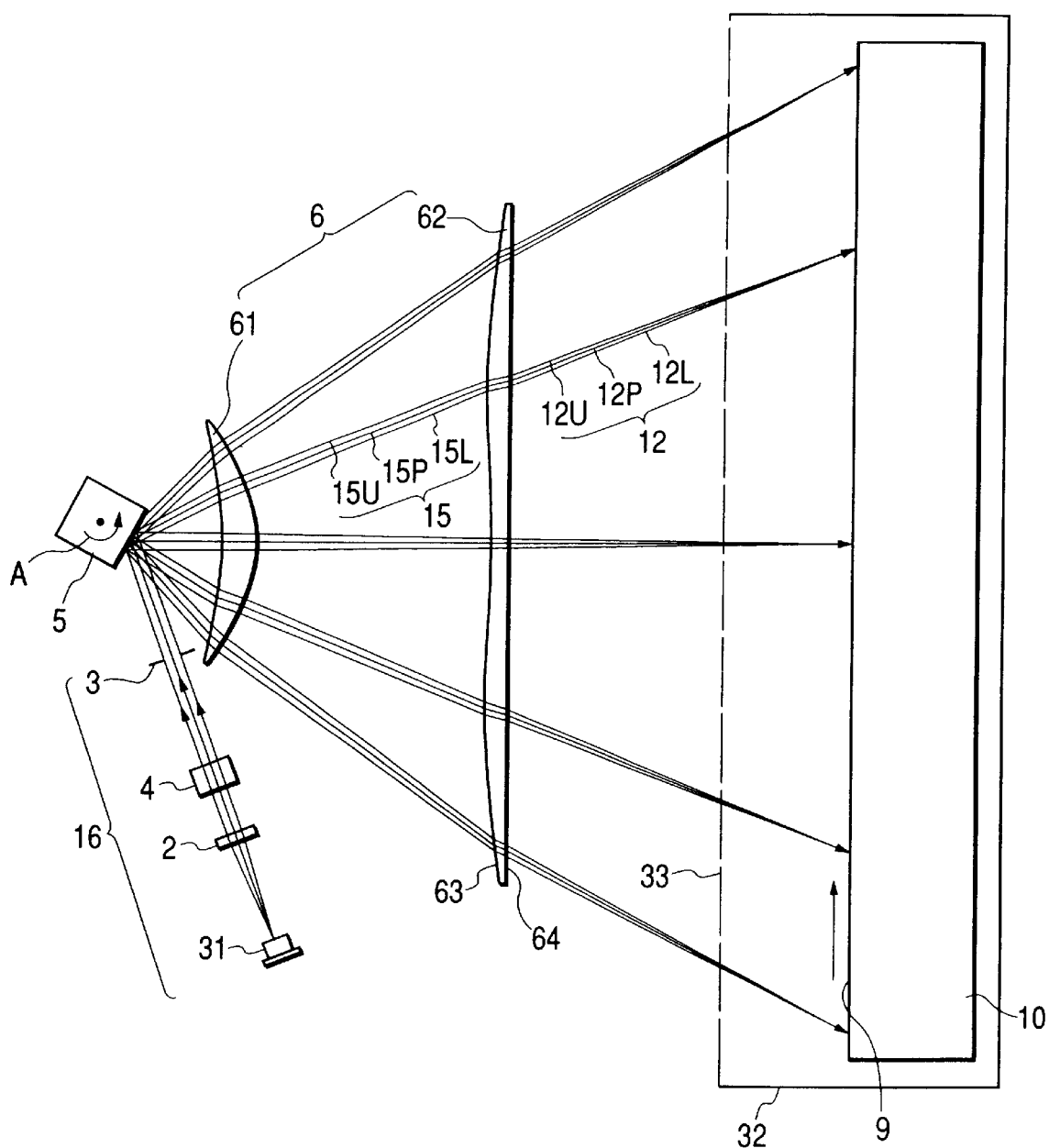
FIG. 3 is a sectional view showing principal part of the second embodiment of the present invention in the main scanning direction.
Figure 4:
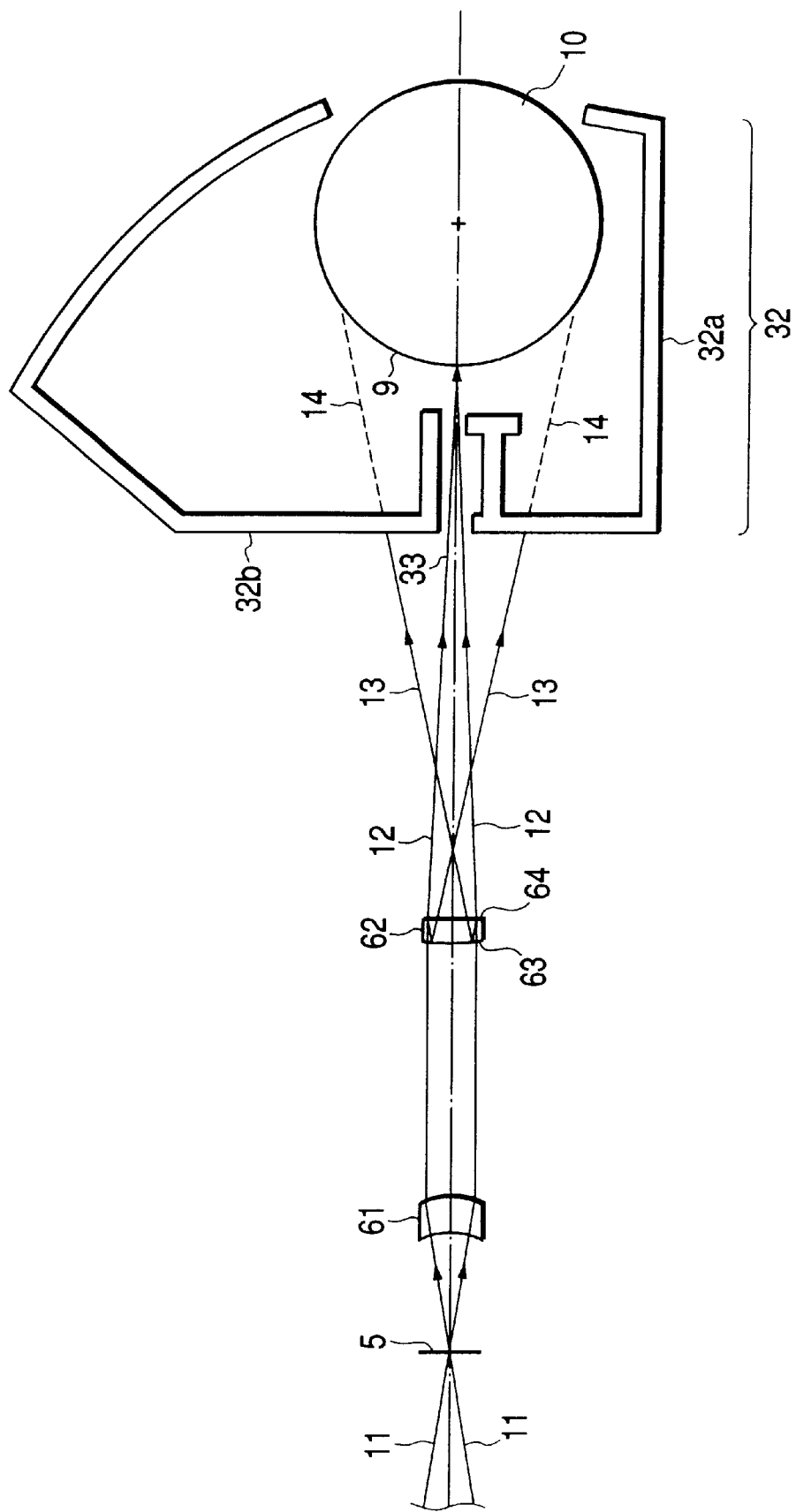
FIG. 4 is a sectional view showing principal part of the second embodiment of the present invention in the sub scanning direction.

FIG. 3 is a sectional view showing principal part of a scanning optical device according to the second embodiment of the present invention in the main scanning direction (main scanning sectional view), and FIG. 4 is a sectional view showing principal part of FIG. 3 in the sub scanning direction (sub scanning sectional view). The same reference numerals in FIGS. 3 and 4 denote the same parts as in FIGS. 1 and 2.

This embodiment has substantially the same arrangement and optical effects as those in the first embodiment, except that the light source means comprises, e.g., a multi-semiconductor laser 31 having a plurality of light-emitting points, and the limiting means comprises an entrance window 33 formed on a casing 32 that holds the photosensitive drum 10 and is made of an opaque resin. With this arrangement, the same effect as in the first embodiment is obtained.

More specifically, in FIG. 3, a light source means 31 comprises a multi-semiconductor laser having a plurality of light-emitting points. A casing 32 covers the photosensitive drum 10, and has an entrance window 33, which is located in the optical path between the diffraction surface 64 and surface 9 to be scanned. The entrance window 33 passes use diffraction light (normally, +1st-order diffraction light) of diffraction light components diffracted by the diffraction surface 64, and intercepts most stray light components of unnecessary diffraction light of other orders.

The behavior of diffraction light obtained by diffracting a light beam 15, which has been reflected and deflected by the beam deflector 5, by the diffraction surface 64 will be explained below using FIG. 4.

In FIG. 4, the casing 32 comprises first and second casing members 32a and 32b, which integrate and cover the photosensitive drum 10 and process members (not shown) that implement a known electrophotography process.

Referring to FIG. 4, stray light 13 is a light beam, which is surface-reflected by the refraction surface 63, is diffracted by the diffraction surface 64, and travels toward the surface 9 to be scanned as use diffraction light (normally, +1st-order diffraction light), of unnecessary diffraction light (reflected sixth-order diffraction light) diffracted by the diffraction surface 64.

The entrance window 33 is formed by those edge portions of the first and second casing members 32a and 32b, that are nearly parallel to the main scanning direction, passes a light beam 12 that forms a primary beam spot as it is, and intercepts most of stray light 13. More specifically, the entrance window 33 limits the stray light of the reflected sixth-order diffraction light. With this structure, stray light 14 that unwontedly reaches the photosensitive drum 10 when no entrance window 33 is formed can be greatly reduced.

As described above, in this embodiment, since the entrance window 33 formed on the casing 32 limits stray light of unnecessary diffraction light of other orders with respect to diffraction light of the order used (use diffraction light) of the diffraction light diffracted by the diffraction surface 64, as described above, a sharp image (beam spot) can be formed on the surface 9 to be scanned, thus preventing a blurred image from being printed in, e.g., a laser beam printer.

In this embodiment, the limiting member (entrance window) that limits unnecessary diffraction light is formed by those edge portions of the first and second casing members 32a and 32b that form the casing 32. However, the present invention is not limited to such specific member. The limiting member which is located between the diffraction surface 64 and surface 9 to be scanned along the main scanning direction may use a member or device that implements a known electrophotography process, e.g., a charger, developer, or the like after its shape is optimized. Furthermore, the limiting member may use a structure such as a frame, side wall, or the like, which is located between the diffraction surface 64 and surface 9 to be scanned.

[Third Embodiment]

Figure 5:
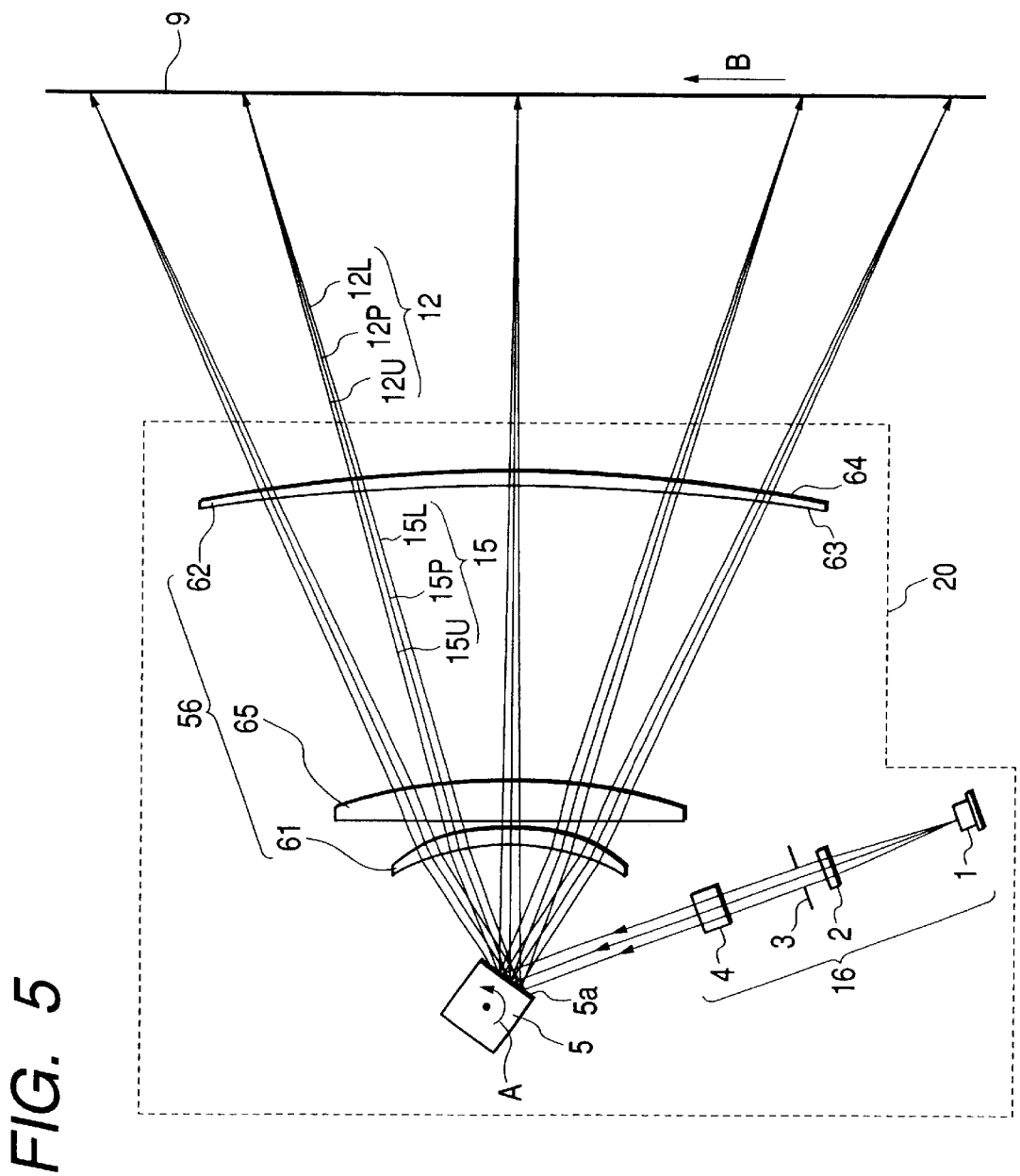
FIG. 5 is a sectional view showing principal part of the third embodiment of the present invention in the main scanning direction.
Figure 6:
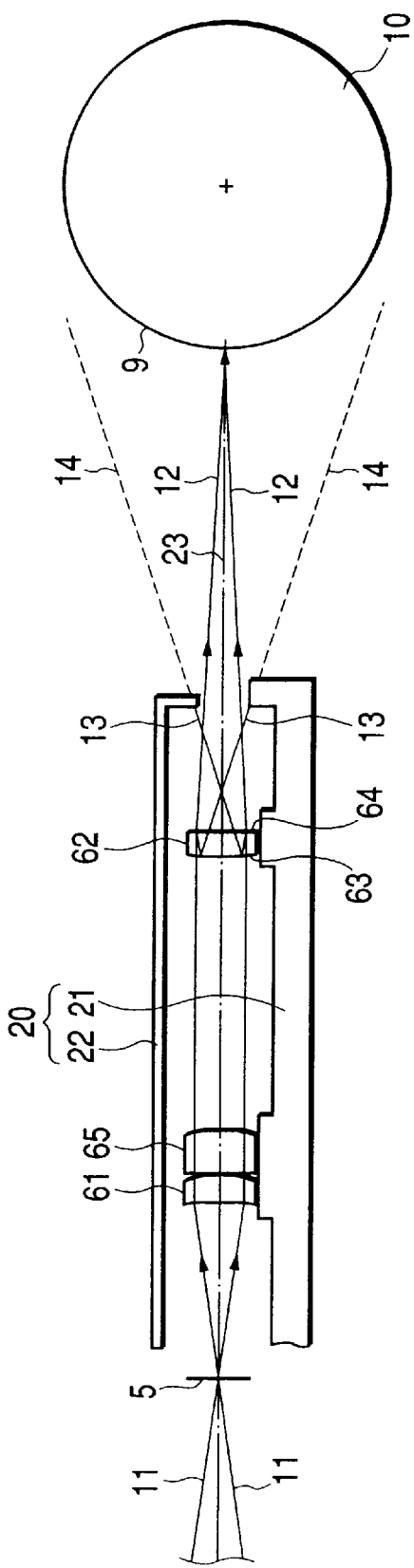
FIG. 6 is a sectional view showing principal part of the third embodiment of ,the present invention in the sub scanning direction.

FIG. 5 is a sectional view showing principal part of a scanning optical device according to the third embodiment of the present invention in the main scanning direction (main scanning sectional view), and FIG. 6 is a sectional view showing principal part of FIG. 5 in the sub scanning direction (sub scanning sectional view). The same reference numerals in FIGS. 5 and 6 denote the same parts as in FIGS. 1 and 2. In this embodiment as well, conditional formulas (1), (2), (3), and (7) hold.

This embodiment has substantially the same arrangement and optical effects as those in the first embodiment, except that the limiting means comprises an exit window 23 formed on a unit casing 20 which is made of an opaque resin, and an image forming means 56 comprises three lenses 61, 65, and 62. With this arrangement, the same effect as in the first embodiment is obtained.

More specifically, in FIG. 5, a unit casing 20 covers the scanning optical device, and has an exit window 23 which is located in the optical path between the diffraction surface 64 and surface 9 to be scanned. The exit window 23 passes use diffraction light (normally, +1st-order diffraction light) of diffraction light components diffracted by the diffraction surface 64, and intercepts most stray light components of unnecessary diffraction light of other orders.

An image forming means (f-θ lens system) 56 having f-θ characteristics has a plastic toric lens 61, spherical lens 65, and long plastic diffraction optical element 62 fabricated by injection molding in turn from the side of the beam deflector 5. The image forming means 56 has different predetermined refractive powers in the main scanning direction and sub scanning direction as the whole system, images a light beam based on image information reflected and deflected by the beam deflector 5 on the surface 9 to be scanned, and corrects surface inclination of the deflection surface 5a of the beam deflector 5. The long diffraction optical element 62 has an entrance surface 63 serving as a refraction surface, and an exit surface 64 serving as a diffraction surface.

The behavior of diffraction light obtained by diffracting a light beam 15, which has been reflected and deflected by the beam deflector 5, by the diffraction surface 64 will be explained below using FIG. 6.

In FIG. 6, the unit casing 20 comprises first and second casing members 21 and 22, and has a known structure used to attach the light source means 1, collimator lens 2, stop 3, cylindrical lens 4, beam deflector 5, image forming means 56, and the like.

Referring to FIG. 6, stray light 13 is a light beam, which is surface-reflected by the refraction surface 63, is diffracted by the diffraction surface 64, and travels toward the surface 9 to be scanned as use diffraction light (normally, +1st-order diffraction light), of unnecessary diffraction light (reflected sixth-order diffraction light) diffracted by the diffraction surface 64.

The exit window 23 is formed by those edge portions of the first and second casing members 21 and 22, that are nearly parallel to the main scanning direction, i.e., slit-like aperture which is elongated in the main scanning direction. The exit window 23 passes a light beam 12 that, forms a primary beam spot as it is, and intercepts most of stray light 13. More specifically, the exit window 23 limits the stray light of the reflected sixth-order diffraction light. With this structure, stray light 14 that unwontedly reaches the photosensitive drum 10 when no exit window 23 is formed can be greatly reduced.

As described above, in this embodiment, since the exit window 23 formed on the casing 20 limits stray light of unnecessary diffraction light of other orders with respect to diffraction light of the order used (use diffraction light) of the diffraction light diffracted by the diffraction surface 64, as described above, a sharp image (beam spot) can be formed on the surface 9 to be scanned, thus preventing a blurred image from being printed in, e.g., a laser beam printer.

Note that the entrance window 33 of the second embodiment and the exit window 23 of this embodiment, which are used as the limiting means, can be combined.

[Fourth Embodiment]

Figure 7:
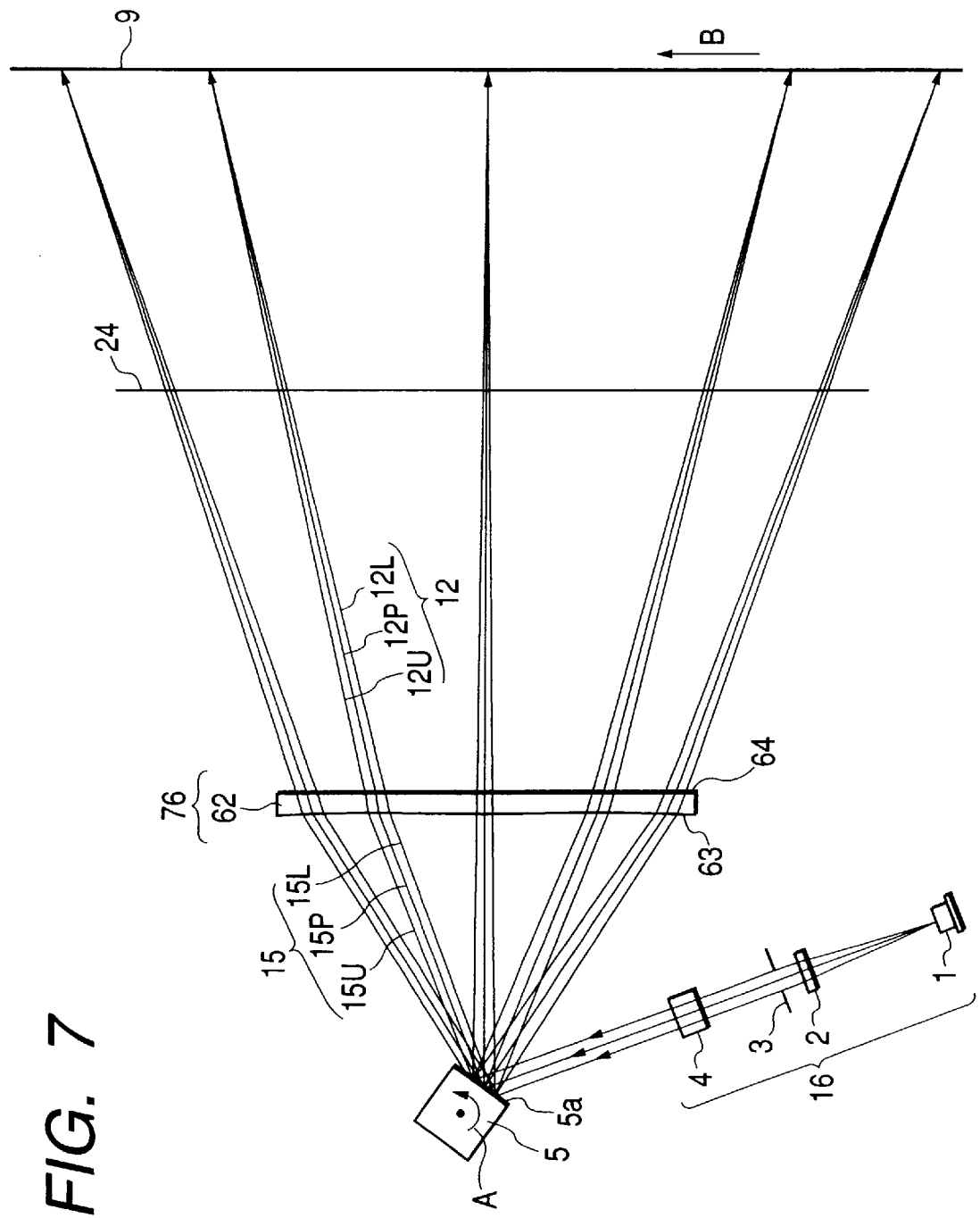
FIG. 7 is a sectional view showing principal part of the fourth embodiment of the present invention in the main scanning direction.
Figure 8:
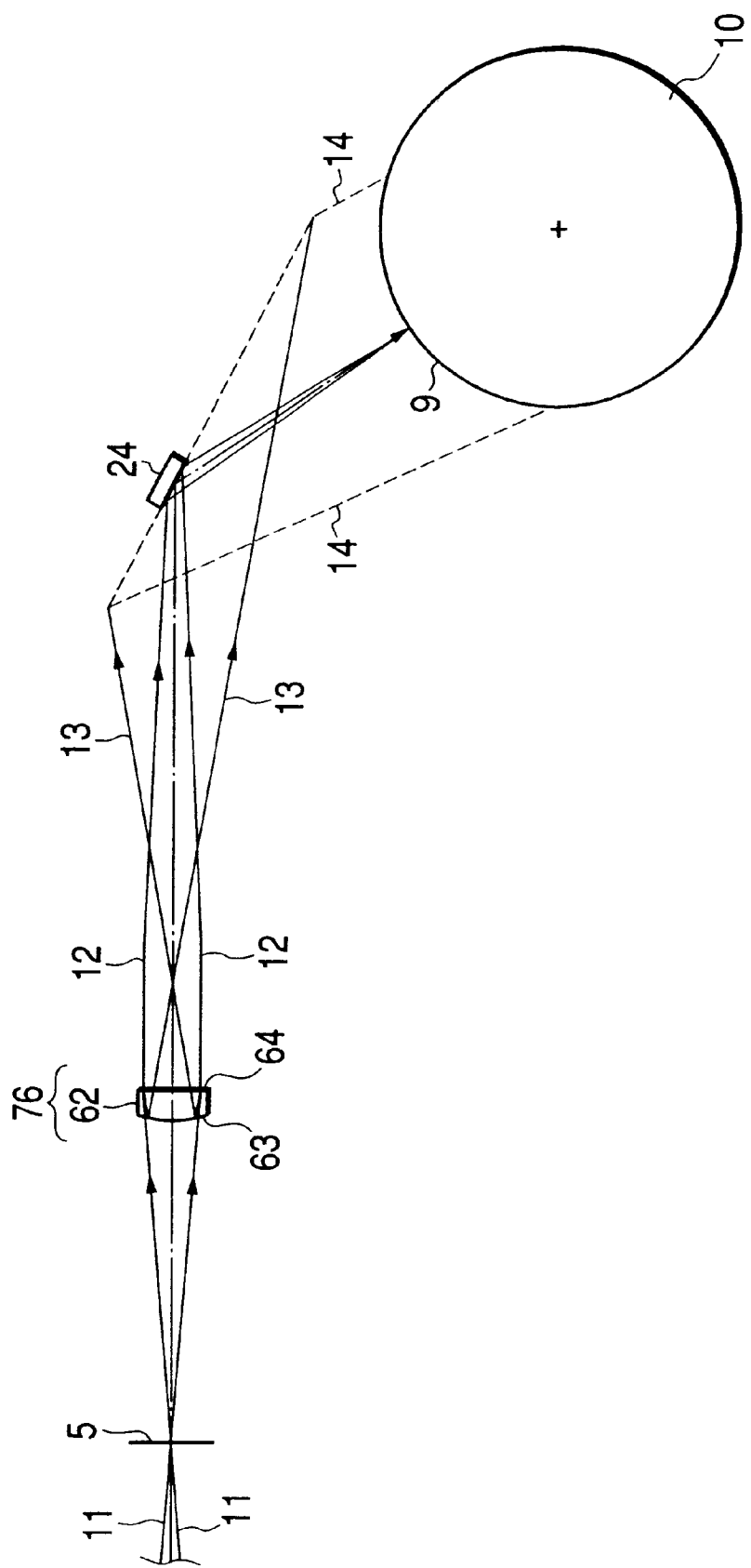
FIG. 8 is a sectional view showing principal part of the fourth embodiment of the present invention in the sub scanning direction.

FIG. 7 is a sectional view showing principal part of a scanning optical device according to the fourth embodiment of the present invention in the main scanning direction (main scanning sectional view), and FIG. 8 is a sectional view showing principal part of FIG. 7 in the sub scanning direction (sub scanning sectional view). The same reference numerals in FIGS. 7 and 8 denote the same parts as in FIGS. 1 and 2.

This embodiment has substantially the same arrangement and optical effects as those in the first embodiment, except that the limiting means comprises a reflection member 24 that changes the direction a light beam travels, an image forming means 76 comprises a single optical element 62, and the base surface of the diffraction grating 64 has a curved shape. With this arrangement, the same effect as in the first embodiment is obtained. In case of the single optical element 62, the shape of the refraction surface 63 and the base surface of the diffraction surface must be a curved shape so as to obtain required optical characteristics on the surface 9 to be scanned.

More specifically, in FIG. 7, a reflection member 24 serves as a limiting means which is inserted in the optical path between the diffraction surface 64 and surface 9 to be scanned. The reflection member 24 comprises a return mirror which is elongated in the main scanning direction and is used to bend the optical path of a light beam that has passed through an image forming means 76. The reflection member 24 reflects use diffraction light (normally, +1st-order diffraction light) of diffraction light diffracted by the diffraction surface 64 toward the photosensitive drum 10 as it is, and makes most of stray light components of unnecessary diffraction light of other orders travel in a direction in which no photosensitive drum 10 is present without reflecting them.

An image forming means (f-θ lens system) 76 having f-θ characteristics has a plastic toric lens 61, spherical lens 65, and long plastic diffraction optical element 62 fabricated by injection molding in turn from the side of the beam deflector 5. The image forming means 76 images a light beam based on image information reflected and deflected by the beam deflector 5 on the surface 9 to be scanned, and corrects any surface inclination of the deflection surface 5a of the beam deflector 5. The long diffraction optical element 62 has an entrance surface 63 serving as a refraction surface, and an exit surface 64 serving as a diffraction surface.

The behavior of diffraction light obtained by diffracting a light beam 15, which has been reflected and deflected by the beam deflector 5, by the diffraction surface 64 will be explained below using FIG. 8.

Referring to FIG. 8, the return mirror 24 reflects a light beam 12 that forms a primary beam spot toward the photosensitive drum 10 as it is, and makes most of stray light components 13 travel in a direction in which no photosensitive drum 10 is present without reflecting them. Hence, the return mirror 24 in this embodiment essentially serves an aperture.

In FIG. 8, stray light 13 is a light beam, which is surface-reflected by the refraction surface 63, is diffracted by the diffraction surface 64, and travels toward the surface 9 to be scanned as use diffraction light (normally, +1st-order diffraction light), of unnecessary diffraction light (reflected sixth-order diffraction light) diffracted by the diffraction surface 64.

The return mirror 24 is so provided as to have an appropriate size so that a light beam 12 forming a primary beam spot is reflected toward the photosensitive drum 10 as it is and most of stray light components 13 is not reflected to travel in a direction in which no photosensitive drum 10 is present. With this structure, stray light 14 that unwantedly reaches the photosensitive drum 10 when the size of the return mirror 24 is large can be greatly reduced.

As described above, in this embodiment, since the return mirror 24 limits stray light of unnecessary diffraction light of other orders with respect to diffraction light of the order used (use diffraction light) of the diffraction light diffracted by the diffraction surface 64, as described above, a sharp image (beam spot) can be formed on the surface 9 to be scanned, thus preventing a blurred image from being printed in, e.g., a laser beam printer.

In the above embodiments, the image forming means (scanning lens system) comprises one to three lenses. However, the present invention is not limited to this. Also, the lens type of the image forming means is not limited to that exemplified in each embodiment, and the present invention can be applied to all image forming means using diffraction optical elements. Furthermore, the number of diffraction surfaces is not limited to one, but diffraction gratings may be formed on a plurality of surfaces.

Moreover, the light source means is not limited to a semiconductor laser. In the above embodiments, a laser having a single light-emitting point or a plurality of light-emitting points is used, but the present invention is not limited to such specific lasers. Furthermore, as a light source of a plurality of beams, known light sources for emitting a plurality of beams such as monolithic multi-beams, multi-beams obtained by mixing a plurality of single beams, and the like may be used.

The descriptions of the above embodiments have been given in consideration of only the sixth-order reflected diffraction light, but the present invention is not limited to such specific diffraction light. As described above, since the order of high-order diffraction light produced varies in correspondence with the refractive index of the diffraction optical element and the order to be used upon design, the present invention can be modified as needed. Also, since the order of high-order diffraction light suffers errors due to height errors of diffraction grating in the actual manufacturing process, the present invention can be modified as needed.

In the present invention, the return mirror 24 preferably comprises a plane mirror having no refractive powers in the main scanning direction and sub scanning direction.

However, the present invention is not limited to such specific mirror, but a mirror having a refracting power such as a cylindrical mirror or the like may be used.

In the present invention, the limiting means described in the first to fourth embodiments is preferably set to limit 50% of unnecessary diffraction light containing the sixth-order reflected diffraction light.

More preferably, the limiting means described in the first to fourth embodiments is set to limit 80% of unnecessary diffraction light containing the sixth-order reflected diffraction light.

The material of the limiting means of the present invention is not limited to an opaque resin, but may be a metal having a light-shielding function such as aluminum or the like.

Deterioration of image quality due to unnecessary diffraction light (stray light) that reaches the surface to be scanned, as the problem to be solved by the present invention, becomes especially serious on the diffraction optical element 62 in which the base surface (reference surface) of the diffraction surface 64 is macroscopically flat.

This is because when the base surface (reference surface) of the diffraction surface 64 is macroscopically flat, unnecessary diffraction light is highly likely to reach the surface 9 to be scanned. Hence, in the present invention, the unnecessary diffraction light is limited by the limiting means 7, 20, 24, and 32 described in the first to fourth embodiments.

Note that the diffraction optical element 62 used in the present invention is not limited to the one in which the base surface (reference surface) of the diffraction surface 64 is macroscopically flat. A diffraction optical element in which the base surface (reference surface) of the diffraction surface 64 is macroscopically curved can be used as the diffraction optical element 62 of the present invention. Even when the base surface (reference surface) of the diffraction surface 64 is macroscopically curved, unnecessary diffraction light reaches the surface 9 to be scanned.

In the first to fourth embodiments, the long, plastic diffraction optical element 62 fabricated by injection molding is used. Also, a diffraction optical element fabricated by a replica method for preparing a diffraction grating on a base substrate may be used.

[Image Forming Apparatus]

Figure 9:
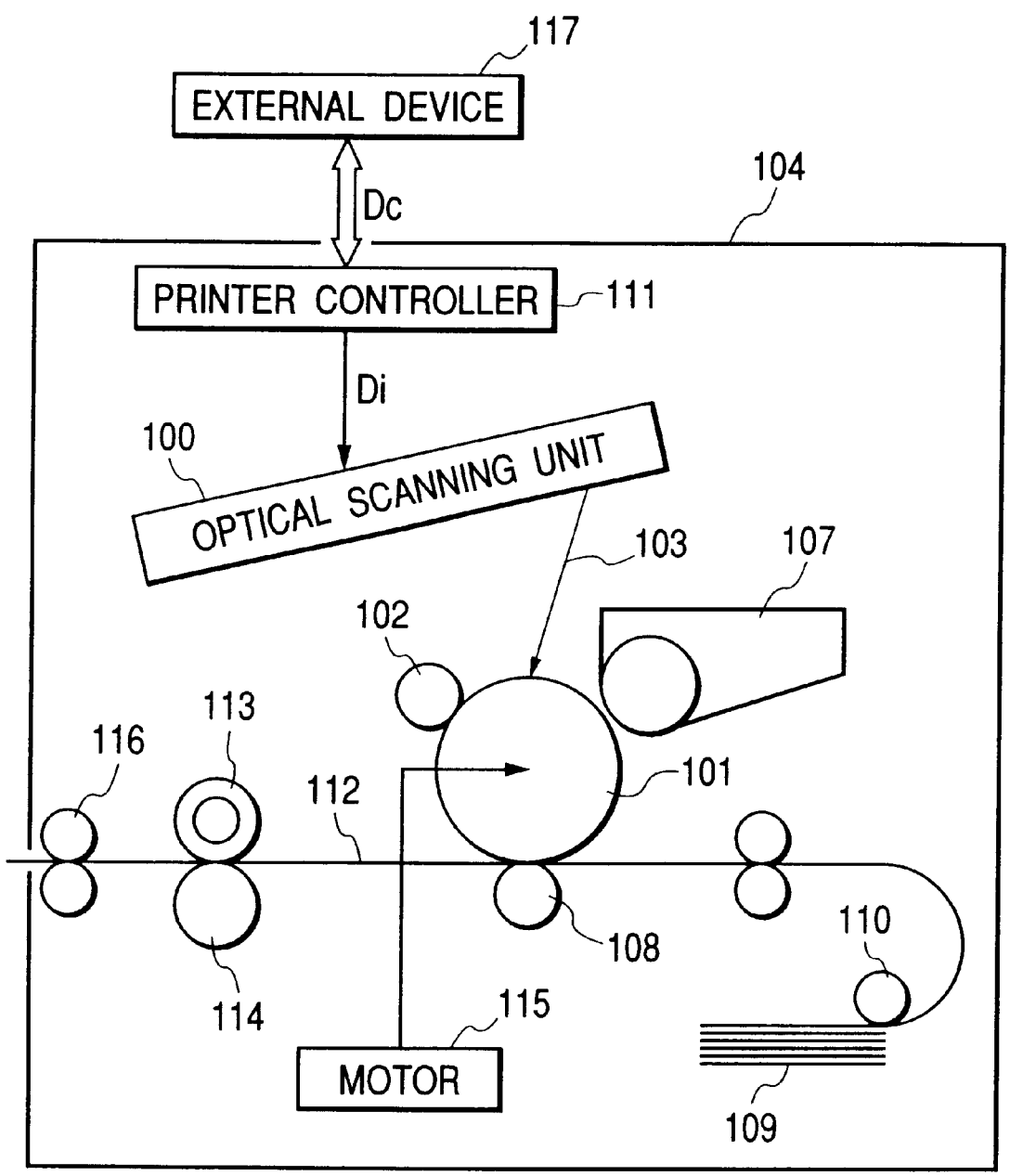
FIG. 9 is a sectional view showing principal part of an image forming apparatus of the present invention in the sub scanning direction.
Figure 10:
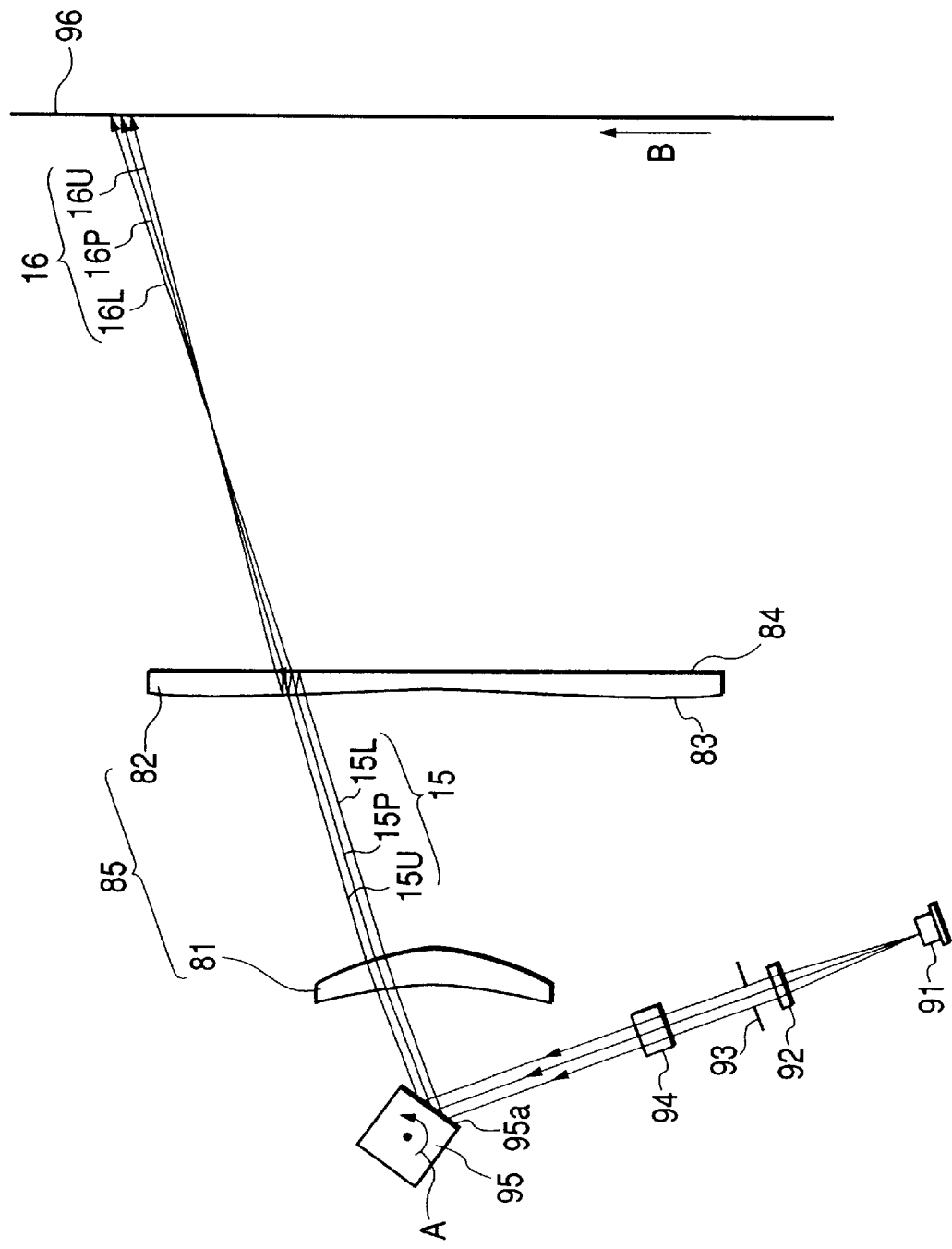
FIG. 10 is a schematic view showing principal part of a conventional scanning optical device.

FIG. 9 is a sectional view showing principal part of an image forming apparatus according to an embodiment of the present invention in the sub scanning direction. In FIG. 9, an image forming apparatus 104 receives code data Dc from an external device 117 such as a personal computer or the like. The code data Dc is converted into image data (dot data) Di by a printer controller 111 in the apparatus. The image data Di is input to an optical scanning unit 100 having the arrangement described in the first to fourth embodiments. The optical scanning unit 100 outputs a light beam 103 which has been modulated in accordance with the image data Di, and the light beam 103 scans the photosensitive surface of a photosensitive drum 101 in the main scanning direction.

The photosensitive drum 101 as an electrostatic latent image carrier (photosensitive body) rotates clockwise by a motor 115. As a result of the rotation, the photosensitive surface of the photosensitive drum 101 moves relative to the light beam 103 in the sub scanning direction perpendicular to the main scanning direction. A charging roller 102 for uniformly charging the surface of the photosensitive drum 101 is located above the photosensitive drum 101 to contact its surface. The surface of the photosensitive drum 101 charged by the charging roller 102 is irradiated with the light beam 103 scanned by the optical scanning unit 100.

As described above, the light beam 103 has been modulated on the basis of the image data Di, and the irradiated light beam 103 forms an electrostatic latent image on the surface of the photosensitive drum 101. The electrostatic latent image is developed as a toner image by a developer 107 which is disposed to contact the photosensitive drum 101 downstream the irradiation position of the light beam 103 in the rotational direction of the photosensitive drum 101.

The toner image developed by the developer 107 is transferred onto a paper sheet 112 as a recording medium by a transfer roller 108 which is located below the photosensitive drum 101 to oppose the drum 101. The paper sheet 112 is stored in a paper cassette 109 in front of (on the right side in FIG. 9 of) the photosensitive drum 101, and can be also fed by manual insertion. A pickup roller 110 is disposed at the end portion of the paper cassette 109, and picks up and feeds a paper sheet 112 in the paper cassette 109 onto the convey path.

The paper sheet 112 onto which the unfixed toner image has been transferred is conveyed to a fixing device behind (on the left side in FIG. 9 of) the photosensitive drum 101. The fixing device comprises a fixing roller 113 having a fixing header (not shown), and a compression roller 114 which is in pressure contact with the fixing roller 113, and fixes the unfixed toner on the paper sheet 112 by compressing and heating the paper sheet 112 conveyed from the transfer device by the nip of the fixing roller 113 and compression roller 114. Discharge rollers 116 are located behind the fixing roller 113 and discharge the fixed paper sheet 112 outside the image forming apparatus.

The printer controller 111 not only performs data conversion mentioned above, but also controls the respective units such as the motor 115 and the like in the image forming apparatus, and a polygon motor and the like in the optical scanning unit (although not shown in FIG. 9).

As described above, according to the present invention, since the limiting means for limiting unnecessary diffraction light produced by the diffraction surface is inserted in the optical path between the diffraction surface and the surface to be scanned, any unnecessary diffraction light component that reaches the surface to be scanned can be reduced, thus achieving a scanning optical device which can obtain a high-quality, sharp image, and an image forming apparatus using the same.

Furthermore, according to the present invention, since any unnecessary diffraction light component that reaches the surface to be scanned can be reduced by devising the shape, size, and the like of the existing member in the device without adding any new limiting member, a scanning optical device which can obtain a high-quality, sharp image, and an image forming apparatus using the same can be realized.

What is claimed is:

1. A scanning optical apparatus comprising:

incident optical means for causing at least one light beam emitted by light source means to be incident on deflection means;

image forming means, having at least one diffraction surface, for forming an image using the at least one light beam reflected and deflected by the deflection means on a surface to be scanned; and limiting means, inserted in an optical path between the at least one diffraction surface of said image forming means and the surface to be scanned, for limiting unnecessary diffraction light of an order different with respect to an order of diffraction light used to form a spot on the surface to be scanned from the diffraction light diffracted by the at least one diffraction surface of said image forming means, wherein a condition:

$$4 \leq m/n \leq 7$$

is satisfied, where n represents the order of the diffraction light used and m represents the order of the unnecessary diffraction light.

2. A scanning optical apparatus according to claim 1, wherein said limiting means is formed by substantially parallel edge portions which extend in a main scanning direction.

3. A scanning optical apparatus according to claim 1, wherein said limiting means is formed by substantially parallel slit members which extend in a main scanning direction.

4. A scanning optical apparatus according to claim 1, wherein said limiting means is formed by a reflection member for changing a direction in which a beam of the diffraction light of the order used travels.

5. A scanning optical apparatus according to claim 1, wherein the diffraction light of the order used is first-order diffraction light and the unnecessary diffraction light is sixth-order reflected diffraction light.

6. A scanning optical apparatus comprising:

incident optical means for causing at least one light beam emitted by light source means to be incident on deflection means;

image forming means, having at least one diffraction surface, for forming an image using the at least one light beam reflected and deflected by the deflection means on a surface to be scanned; and limiting means, inserted in an optical path between the at least one diffraction surface of said image forming means and the surface to be scanned, for limiting unnecessary diffraction light of an order different with respect to an order of diffraction light used to form a spot on the surface to be scanned from the diffraction light diffracted by the at least one diffraction surface of said image forming means, wherein said limiting means is formed by an entrance window and/or an exit window formed on a casing which holds at least one of a plurality of components that build said scanning optical device.

7. A scanning optical apparatus comprising:

incident optical means for causing at least one light beam emitted by light source means to be incident on deflection means;

image forming means, having at least one diffraction surface, for forming an image using the at least one light beam reflected and deflected by the deflection means on a surface to be scanned; and limiting means, inserted in an optical path between the at least one diffraction surface of said image forming means and the surface to be scanned, for limiting unnecessary diffraction light of an order different with respect to an order of diffraction light used to form a spot on the surface to be scanned from the diffraction light diffracted by the at least one diffraction surface of said image forming means, wherein a scan width of the unnecessary diffraction light satisfies:

$$Lm/Lo < 0.8$$

where Lm represents the scan width of the unnecessary diffraction light and Lo represents an effective scan width.

8. A scanning optical apparatus comprising:

incident optical means for causing at least one light beam emitted by light source means to be incident on deflection means;

image forming means, having at least one diffraction surface, for forming an image using the at least one light beam reflected and deflected by the deflection means on a surface to be scanned; and limiting means, inserted in an optical path between the at least one diffraction surface of said image forming means and the surface to be scanned, for limiting unnecessary diffraction light of an order different with respect to an order of diffraction light used to form a spot on the surface to be scanned from the diffraction light diffracted by the at least one diffraction surface of said image forming means, wherein a condition:

$$\phi o < S < \phi m$$

is satisfied, where S represents a width of an aperture of said limiting means in a sub-scanning direction, $\phi o$ represents a light beam size, with respect to the sub-scanning direction of the light beam that is to form a primary beam spot, at the position of said limiting means, and $\phi m$ represents a size of stray light of reflected sixth-order diffraction light with respect to the sub-scanning direction.

9. A scanning optical apparatus comprising:

incident optical means for causing at least one light beam emitted by light source means to be incident on deflection means;

image forming means, having at least one diffraction surface, for forming an image using the at least one light beam reflected and deflected by the deflection means on a surface to be scanned; and limiting means, inserted in an optical path between the at least one diffraction surface of said image forming means and the surface to be scanned, for limiting unnecessary diffraction light of an order different with respect to an order of diffraction light used to form a spot on the surface to be scanned from the diffraction light diffracted by the at least one diffraction surface of said image forming means, wherein a condition:

$$\sqrt{(S/\phi m)} < Lm/Lo$$

is satisfied, where S represents a width of an aperture of said limiting means in the sub-scanning direction, $\phi m$ represents a size of stray light of reflected sixth-order diffraction light with respect to the sub-scanning direction, Lm represents a scan width of the unnecessary diffraction light, and Lo represents an effective scan width.

10. A scanning optical apparatus comprising:

incident optical means for causing at least one light beam emitted by light source means to be incident on deflection means;

image forming means, having at least one diffraction surface, for forming an image using the at least one light beam reflected and deflected by the deflection means on a surface to be scanned; and limiting means, inserted in an optical path between the at least one diffraction surface of said image forming means and the surface to be scanned, for limiting unnecessary diffraction light of an order different with respect to an order of diffraction light used to form a spot on the surface to be scanned from the diffraction light diffracted by the at least one diffraction surface of said image forming means.

11. A scanning optical apparatus according to claim 10, wherein said limiting means is formed by substantially parallel edge portions which extend in a main scanning direction.

12. A scanning optical apparatus according to claim 10, wherein said limiting means is formed by substantially parallel slit members which extend in a main scanning direction.

13. A scanning optical apparatus according to claim 10, wherein said limiting means is formed by a reflection member for changing a direction in which a beam of the diffraction light of the order used travels.

14. A scanning optical apparatus according to claim 10, wherein said image forming means has at least one refraction surface, and the at least one diffraction surface is provided to correct changes in focus due to temperature drift.

15. An image forming apparatus comprising:

a scanning optical apparatus defined in claim 10;

a photosensitive member located at the surface to be scanned of said scanning optical apparatus;

developing means for developing as a toner image an electrostatic latent image formed by scanning a surface of said photosensitive member with a light beam;

transfer means for transferring the developed toner image onto a paper sheet; and fixing means for fixing the transferred toner image on the paper sheet.

16. An image forming apparatus comprising:

a scanning optical apparatus defined in claim 10; and a printer controller for converting code data input from an external device into an image signal, and inputting the image signal to said scanning optical apparatus.

* * * * *

UNITED STATES PATENT AND TRADEMARK OFFICE
CERTIFICATE OF CORRECTION

PATENT NO. : 6,639,704 B2
DATED : October 28, 2003
INVENTOR(S) : Kazumi Kimura

It is certified that error appears in the above-identified patent and that said Letters Patent is hereby corrected as shown below:

Title page,
Item [56], References Cited, U.S. PATENT DOCUMENTS, add the following:
-- 5,448,403    9/1995    Harris ............359/562 --.

Column 6,
Line 42, "line" should read -- linear --.

Column 11,
Line 56, "serves" should read -- serves as --.

Column 12,
Line 1, "is" should read -- are --

Column 18,
Line 12, add Claims 17 and 18, as follows:
  -- 17. An image forming apparatus comprising:
  a scanning optical apparatus defined in any one of claims 1 and 6-9;
  a photosensitive member located at the surface to be scanned of said scanning optical apparatus;
  developing means for devolping as a toner image in an electrostatic latent image formed by scanning a surface of said photosensitive member with a light beam;
  transfer means for transferring the developed tomer image onto a paper sheet; and
  fixing means for fixing the transferred toner image on the paper sheet.
    18. An image forming apparatus comprising:
  a scanning optical apparatus defined in any one of claims 1 and 6-9; and
  a printer controller for converting code data input from an external device into an image signal, and inputting the image signal to said scanning optical apparatus. --

Signed and Sealed this

Fourteenth Day of September, 2004

JON W. DUDAS
*Director of the United States Patent and Trademark Office*